United States Patent
Tang et al.

(10) Patent No.: US 11,018,545 B2
(45) Date of Patent: May 25, 2021

(54) ELECTRIC MACHINE WINDING ASSEMBLY

(71) Applicant: Ford Global Technologies, LLC, Dearborn, MI (US)

(72) Inventors: Chun Tang, Canton, MI (US); Huifen Qiu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 480 days.

(21) Appl. No.: 16/053,934

(22) Filed: Aug. 3, 2018

(65) Prior Publication Data
US 2020/0044507 A1   Feb. 6, 2020

(51) Int. Cl.
*H02K 1/00* (2006.01)
*H02K 3/52* (2006.01)
*H02K 15/00* (2006.01)
*H02K 3/34* (2006.01)
*H02K 3/14* (2006.01)

(52) U.S. Cl.
CPC .............. *H02K 3/524* (2013.01); *H02K 3/14* (2013.01); *H02K 3/34* (2013.01); *H02K 15/0068* (2013.01)

(58) Field of Classification Search
CPC ........ H02K 3/12; H02K 15/0056; H02K 1/16; H02K 15/0037; H02K 3/28; H02K 3/38; H02K 3/50; H02K 3/505; H02K 15/0031; H02K 15/04; H02K 15/0421; H02K 15/064; H02K 15/0087; H02K 15/063; H02K 3/04; H02K 3/30; H02K 3/34; H02K 3/14; H02K 3/524; H02K 15/0068
See application file for complete search history.

(56) References Cited

U.S. PATENT DOCUMENTS

| | | | | |
|---|---|---|---|---|
| 6,459,177 B1 * | 10/2002 | Nakamura | ............... | H02K 3/12 310/201 |
| 6,490,779 B1 * | 12/2002 | Tokizawa | ................. | H02K 3/12 29/596 |
| 6,865,796 B1 | 3/2005 | Oohashi et al. | | |
| 7,256,364 B2 * | 8/2007 | Gentry | ................. | B23K 1/0004 219/85.15 |
| 8,659,202 B2 | 2/2014 | Ikeda | | |
| 8,884,487 B2 * | 11/2014 | Utaka | ...................... | H02K 3/28 310/201 |
| 8,907,540 B2 * | 12/2014 | Hamer | ..................... | H02K 3/38 310/201 |
| 9,531,227 B2 * | 12/2016 | Azusawa | ................. | H02K 3/12 |
| 2006/0141874 A1 | 6/2006 | Lenoir et al. | | |

* cited by examiner

*Primary Examiner* — Thanh Lam
(74) *Attorney, Agent, or Firm* — David B. Kelley; Brooks Kushman P.C.

(57) ABSTRACT

An electric machine winding assembly including a stator and windings is provided. The stator may define a central axis. The windings may extend from the stator and each may include a pair of conductor ends. Each conductor end may include a minor side and a major side. The windings are arranged with the stator such that each of the major sides are aligned along a circumferential conductor axis relative to the central axis to facilitate welding adjacent conductor ends to one another. Each of the windings may further include two portions defining a U shape. Each of the two portions may include a lower portion, a mid-portion, and an upper portion. One of the mid-portions may include a first bend defining a twist shape to orient the major sides of one of the pair of conductor ends along the circumferential conductor axis.

20 Claims, 14 Drawing Sheets

ELECTRIC MACHINE WINDING ASSEMBLY

TECHNICAL FIELD

The present disclosure relates to vehicle electric machine assemblies.

BACKGROUND

Extended drive range technology for electrified vehicles, such as battery electric vehicles ("BEVs") and plug in hybrid vehicles ("PHEVs"), is continuously improving. Achieving these increased ranges, however, often requires traction batteries and electric machines to have higher power outputs and associated thermal management systems with increased capacities in comparison to previous BEVs and PHEVs. Improving electric machine winding assemblies may improve power outputs and vehicle performance.

SUMMARY

An electric machine winding assembly includes a stator and windings. The stator defines a central axis. The windings extend from the stator and each includes a pair of conductor ends. Each conductor end includes a minor side and a major side. The windings are arranged with the stator such that each of the major sides are aligned along a circumferential conductor axis relative to the central axis to facilitate welding adjacent conductor ends to one another. Each of the windings may further include two portions defining a U shape. Each of the two portions may include a lower portion, a mid-portion, and an upper portion. One of the mid-portions may include a first bend defining a twist shape to orient the major sides of one of the pair of conductor ends along the circumferential conductor axis. The other of the mid-portions may define an upward bend shape to orient the major sides of the other of the pair of conductor ends along the circumferential conductor axis. The windings may further include a second pair of conductor ends, each including a minor and a major side. The major sides of each of the second pair of conductor ends may be radially spaced from the major sides of the pair of conductor ends to define an insulation gap therebetween and sized to receive an insulation layer. The windings may further include at least two pairs of windings circumferentially spaced from one another to define a clamp gap therebetween and sized to receive a portion of a clamp tool to compress pairs of conductor ends of each of the at least two pairs of windings toward one another. The stator may further define one or more circumferential stator axes about the central axis. The circumferential conductor axis may be substantially parallel to one of the one or more circumferential stator axes.

A vehicle electric machine winding assembly includes a stator and at least two pairs of windings. The stator defines a central axis and one or more circumferential axes about the central axis. Each of the at least two pairs of windings extends from the stator. Each includes first and second conductor ends. One of the two pairs of windings includes an upper portion including a first bend to orient one of the first and second conductor ends along one of the one or more circumferential axes for welding to one another. Major sides of each of the at least two pairs of windings may be radially spaced from one another to define an insulation gap therebetween and sized to receive an insulation layer. Each of the windings may further include a lower portion and a mid-portion. The other upper portion may include a second bend shaped to orient a plane defined by a first face of a respective conductor end substantially parallel with a second face of a respective upper portion. Each of the windings may include a second bend orienting a respective mid-portion substantially parallel to the central axis. Each of the first and second conductor ends may include a minor side shorter than a major side. Each of the major sides may be aligned with one another along one of the one or more circumferential axes. The windings may further include at least three pairs of windings each including first and second conductor ends. Each of the at least three pairs of windings may be circumferentially spaced from one another to define a clamp gap between each of the at least three pairs of windings sized to receive a portion of a clamp tool to compress respective first and second connector ends toward one another. The first bend may define a twist shape. The other of the two pairs of windings may include a second upper portion including a third bend to orient a first plane defined by a first side face of the other of first and second conductor ends substantially parallel with a second plane defined by a second side face of one of the second upper portion.

An electric machine winding assembly includes a stator and a plurality of pairs of windings. The stator defines a central axis and one or more circumferential axes about the central axis. Each of the plurality of pairs of windings extends from the stator. Each winding of the plurality of pairs of windings includes first and second members. Each of the first and second members includes a lower portion, a mid-portion, and an upper portion having a conductor end secured thereto. One of the upper portions includes a first bend defining a twist shape to orient a respective conductor end along one of the one or more circumferential axes. The plurality of pairs of windings may include at least two pairs of windings radially spaced from one another to define an insulation gap therebetween and sized to receive an insulation layer. The plurality of pairs of windings may further include at least two pairs of windings circumferentially spaced from one another to define a clamp gap therebetween and sized to receive a portion of a clamp tool to compress pairs of conductor ends of each of the at least two pairs of windings toward one another. Each of the conductor ends may include a pair of opposing minor sides and a pair of opposing major sides. Each of the pair of opposing major sides may be aligned with one another along an axis that is not oriented radially relative to the central axis. One of the upper portions of each of the first and second member may include a second bend defining an upward bend to orient a first plane defined by a first side face of one of the conductor ends substantially parallel with a second plane defined by a second side face of one of a respective upper portion. Each of the first and second members may include a third bend between a respective lower portion and a respective mid-portion to orient each of the mid-portions substantially parallel with the central axis of the stator.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
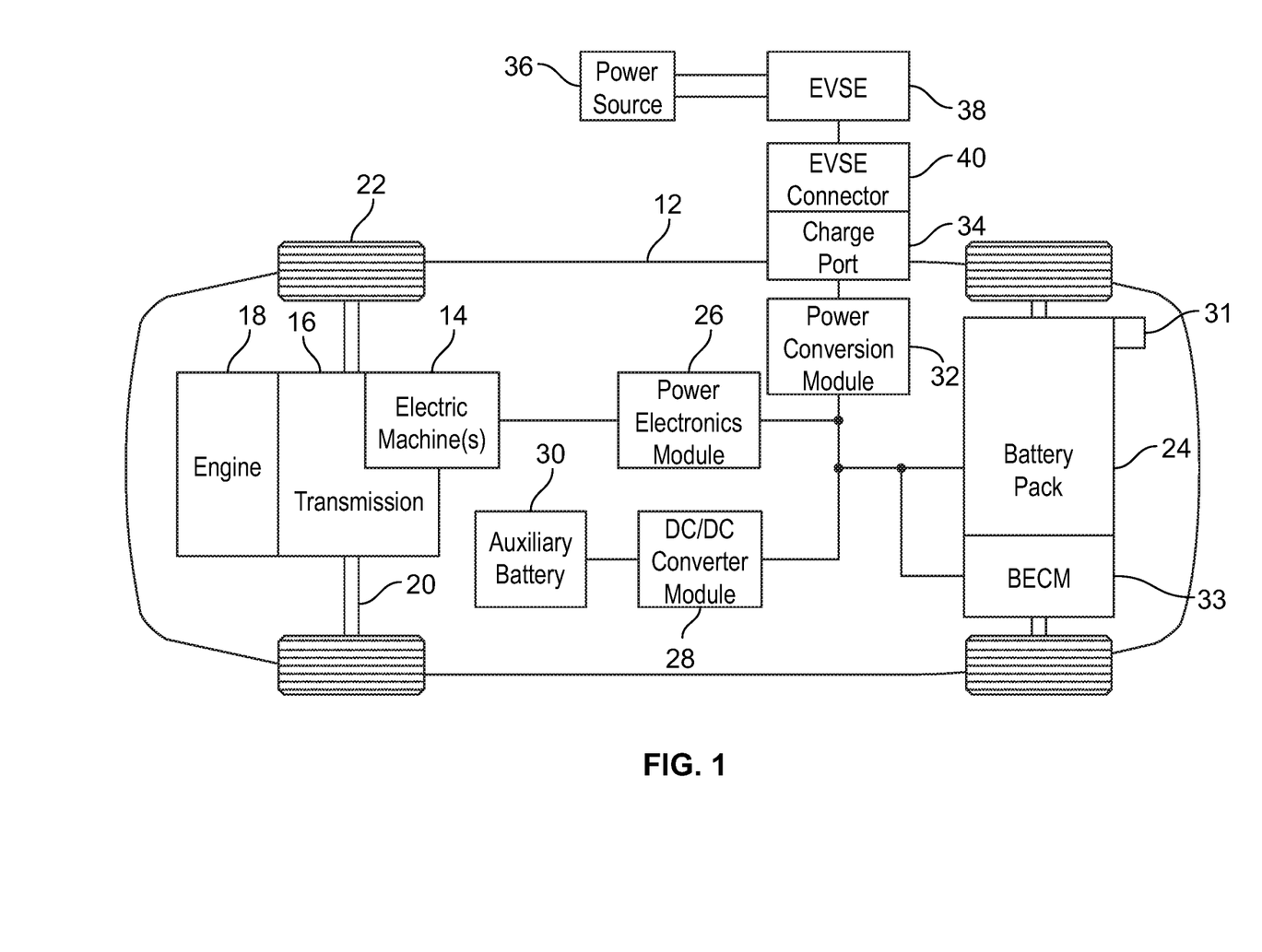
FIG. 1 is a schematic diagram illustrating an example of an electrified vehicle.

FIG. 1 depicts a schematic representation of an example of an electrified vehicle. In this example, the electrified vehicle is a plug-in hybrid electric vehicle (PHEV) referred to as a vehicle 12 herein. The vehicle 12 may include one or more electric machines 14 mechanically connected to a hybrid transmission 16. Each of the electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to wheels 22. The electric machines 14 may provide propulsion and deceleration capability when the engine 18 is turned on or off. The electric machines 14 may also operate as generators and provide fuel economy benefits by recovering energy that would normally be lost as heat in, for example, a friction braking system.

A traction battery 24 stores energy that can be used by the electric machines 14. The traction battery 24 may provide a high voltage DC output from one or more battery cell arrays, sometimes referred to as battery cell stacks, within the traction battery 24. Each of the battery cell arrays may include one or more battery cells. The traction battery 24 is electrically connected to one or more power electronics modules 26 through one or more contactors (not shown). The one or more contactors isolate the traction battery 24 from other components when opened and connects the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a twelve-volt battery).

A battery electrical control module (BECM) 33 may be in communication with the traction battery 24. The BECM 33 may act as a controller for the traction battery 24 and may also include an electronic monitoring system that manages temperature and charge state of each battery cell of the traction battery 24. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36 such as an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The charge connector 40 may have pins that mate with corresponding recesses of the charge port 34.

Figure 2:
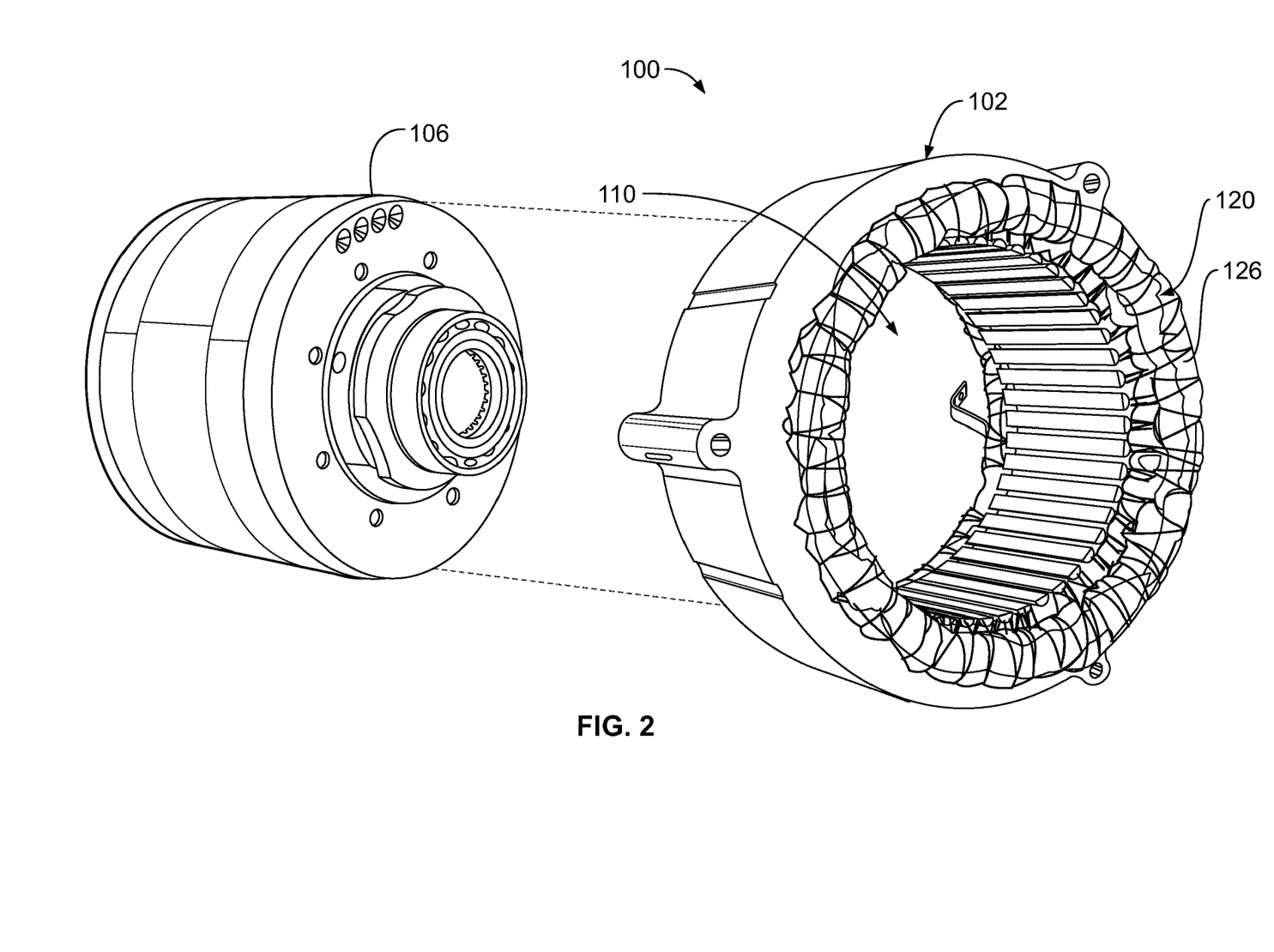
FIG. 2 is a perspective exploded view of an example of a portion of an electric machine.

FIG. 2 shows a partially exploded view of an example of portions of an electric machine assembly for an electrified vehicle, referred to generally as an electric machine assembly 100 herein. The electric machine assembly 100 may include a stator core 102 and a rotor 106. As mentioned above, electrified vehicles may include more than one electric machine that may individually operate as a motor or generator. The motor may operate to convert electricity to mechanical power and the generator may operate to convert mechanical power to electricity. The stator core 102 may define a cavity 110. The rotor 106 may be sized for disposal and operation within the cavity 110. A shaft of the rotor 106 and may be coupled to other vehicle components to transfer mechanical power therefrom.

Windings 120 may extend from the stator core 102. In an electric machine motor example, current may be fed to the windings 120 to obtain a rotational force on the rotor 106. In an electric machine generator example, current generated in the windings 120 by a rotation of the rotor 106 may be used to power vehicle components. Portions of the windings 120, such as end windings 126, may protrude from within the cavity 110. During operation of the electric machine assembly 100, heat may be generated along the windings 120 and end windings 126. The rotor 106 may include magnets such that rotation of the rotor 106 in cooperation with an electric current running through the end windings 126 generates one or more magnetic fields. For example, electric current running through the end windings 126 generates a rotating magnetic field. Magnets of the rotor 106 will magnetize and rotate with the rotating magnetic field to rotate the shaft 112 for mechanical power.

Figure 3A:
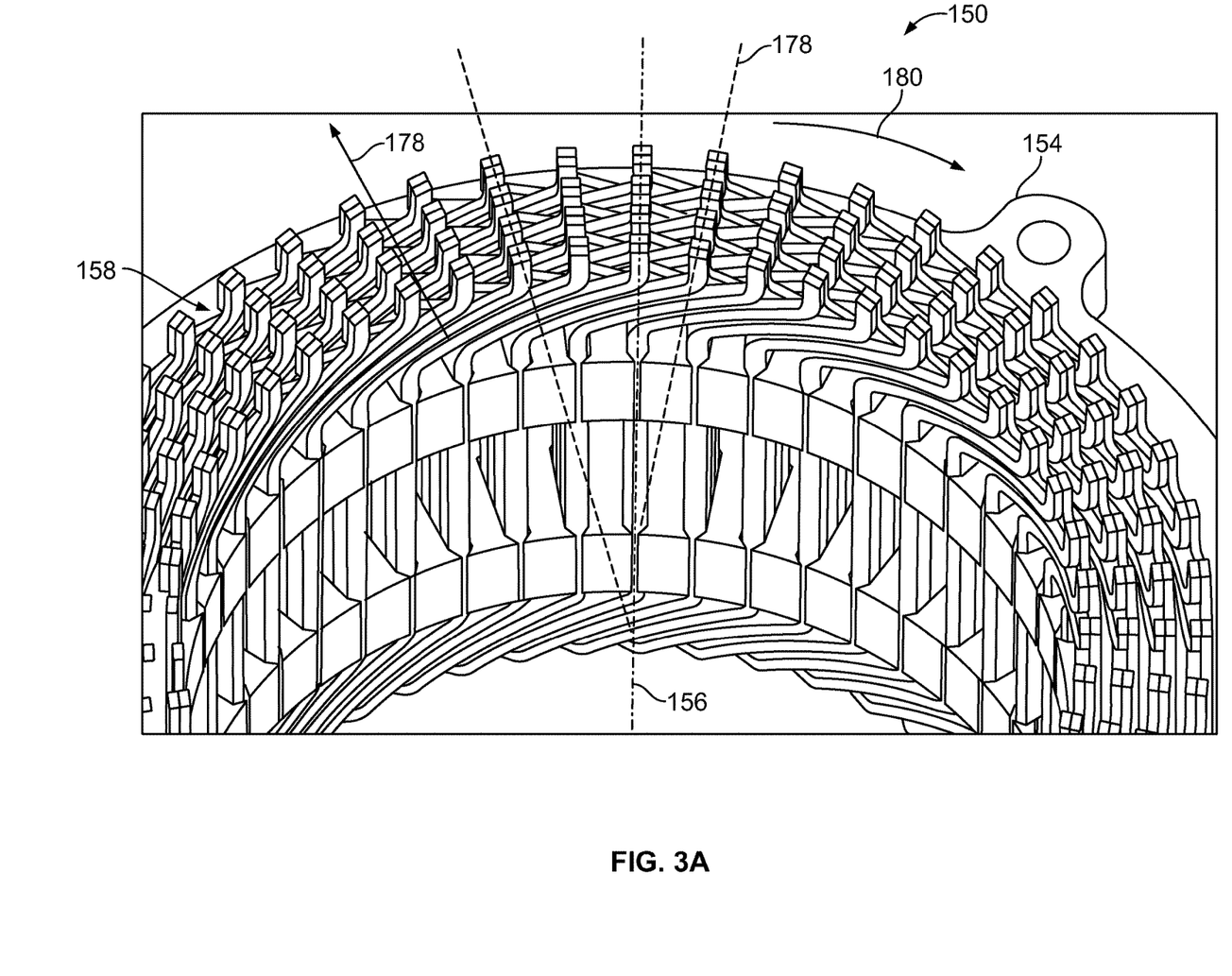
FIG. 3A is a perspective view of a portion of a prior art electric machine assembly
Figure 3B:
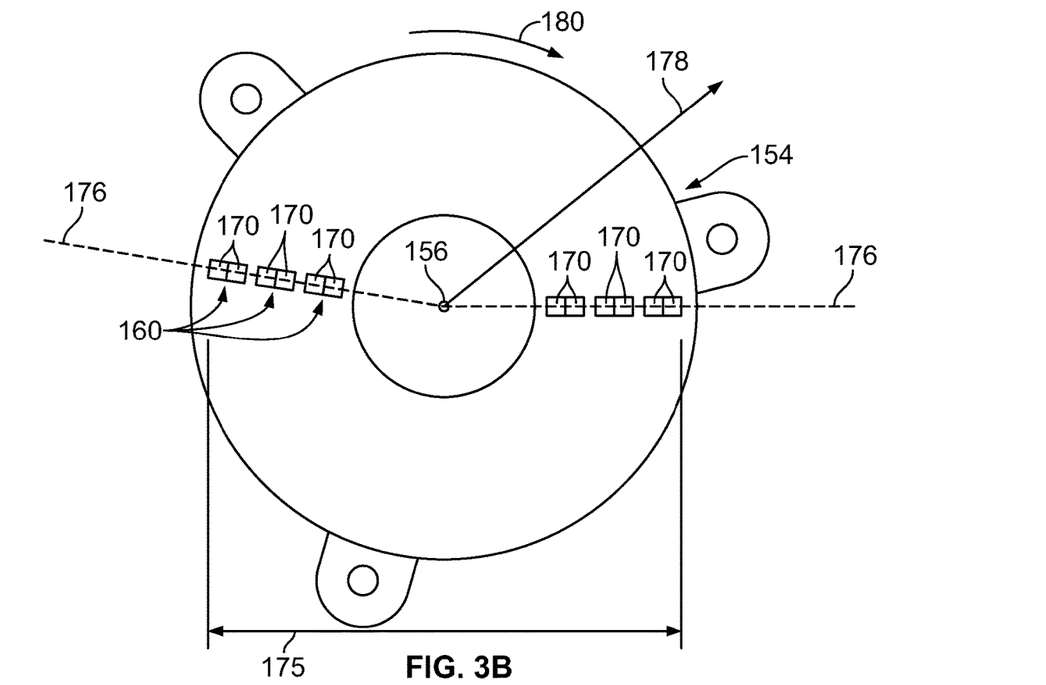
FIG. 3B is a top plan view of the electric machine assembly of FIG. 3A illustrating a radial alignment of winding conductor ends.
Figure 3C:
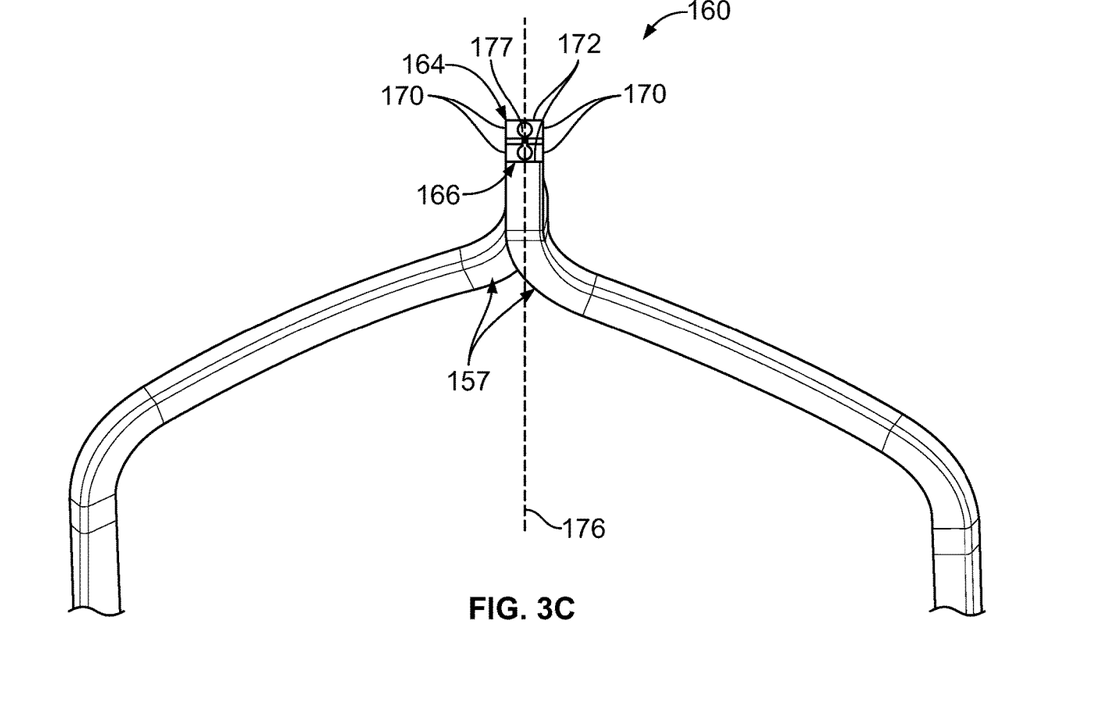
FIG. 3C is a detailed perspective view of a portion of the electric machine assembly of FIG. 3A illustrating a radial alignment of winding conductor ends.

FIGS. 3A through 3C illustrate an example of a portion of a prior art electric machine assembly including winding conductor ends oriented in a radial alignment relative to a stator central axis, referred to generally as an electric machine assembly 150 herein. The electric machine assembly 150 includes a stator 154 defining a central axis 156 and has windings 158 extending from the stator 154.

The windings 158 include a plurality of winding pairs 160 (partially shown in FIG. 3C). Each of the winding pairs 160 includes a first conductor end 164 and a second conductor end 166. Each of the conductor ends includes a pair of opposing minor sides 170 and a pair of opposing major sides 172. The minor sides 170 of each winding pair 160 are aligned with one another along one or more radial axes 176. Each radial axis 176 extends from the central axis 156 to an outer portion of the stator 154. Arrow 178 represents a radial direction relative to the central axis 156 and arrow 180 represents a circumferential direction relative to the central axis 156. The first conductor end 164 and the second conductor end 166 are radially aligned to facilitate welding to one another along the radial axis 176 as represented by welds 177. An orientation of the pairs of conductors in this example defines a winding diameter 175.

In this example, each of the conductor ends is bent outward relative to the stator 154 central axis 156 at one of a pair of bends 157 to align minor sides 170 of each of the first conductor end 164 and the second conductor end 166 along one of the radial axes 176. Alignment along one of the radial axes 176 results in the winding diameter 175 being larger than desired and results in poor insultation due to a size of a small gap between weld joints in a radial direction.

FIGS. 4A through 4E illustrate an example of a portion of a vehicle electric machine winding assembly including winding conductor ends oriented in a circumferential alignment relative to a stator central axis, referred to generally as an electric machine winding assembly 200 herein. The electric machine winding assembly 200 includes a stator 202 and a plurality of pairs of windings 204. The stator 202 defines a central axis 208 and one or more circumferential axes 210 shaped substantially circular about the central axis 208. For example, each portion of each of the circumferential axes 210 may be spaced substantially equidistant from the central axis 208. Each of the plurality of pairs of windings 204 includes a pair of conductor ends. Each of the plurality of pairs of windings 204 are arranged with the stator 202 such that each conductor is adjacent another conductor of a different winding of the plurality of pairs of windings 204 as further described herein. Each of the pairs of windings 204 extends through respective slots of the stator 202. Arrow 203 represents a radial direction relative to the central axis 208 and arrow 205 represents a circumferential direction relative to the central axis 208 as most clearly seen in a top plan view in FIG. 4C. An orientation of the pairs of conductors in this example defines a winding diameter 215. The winding diameter 215 is of a length less than the winding diameter 175 described above. This lesser diameter length provides more packaging space in comparison with the winding diameter 175 of the electric machine assembly 150.

Figure 4A:
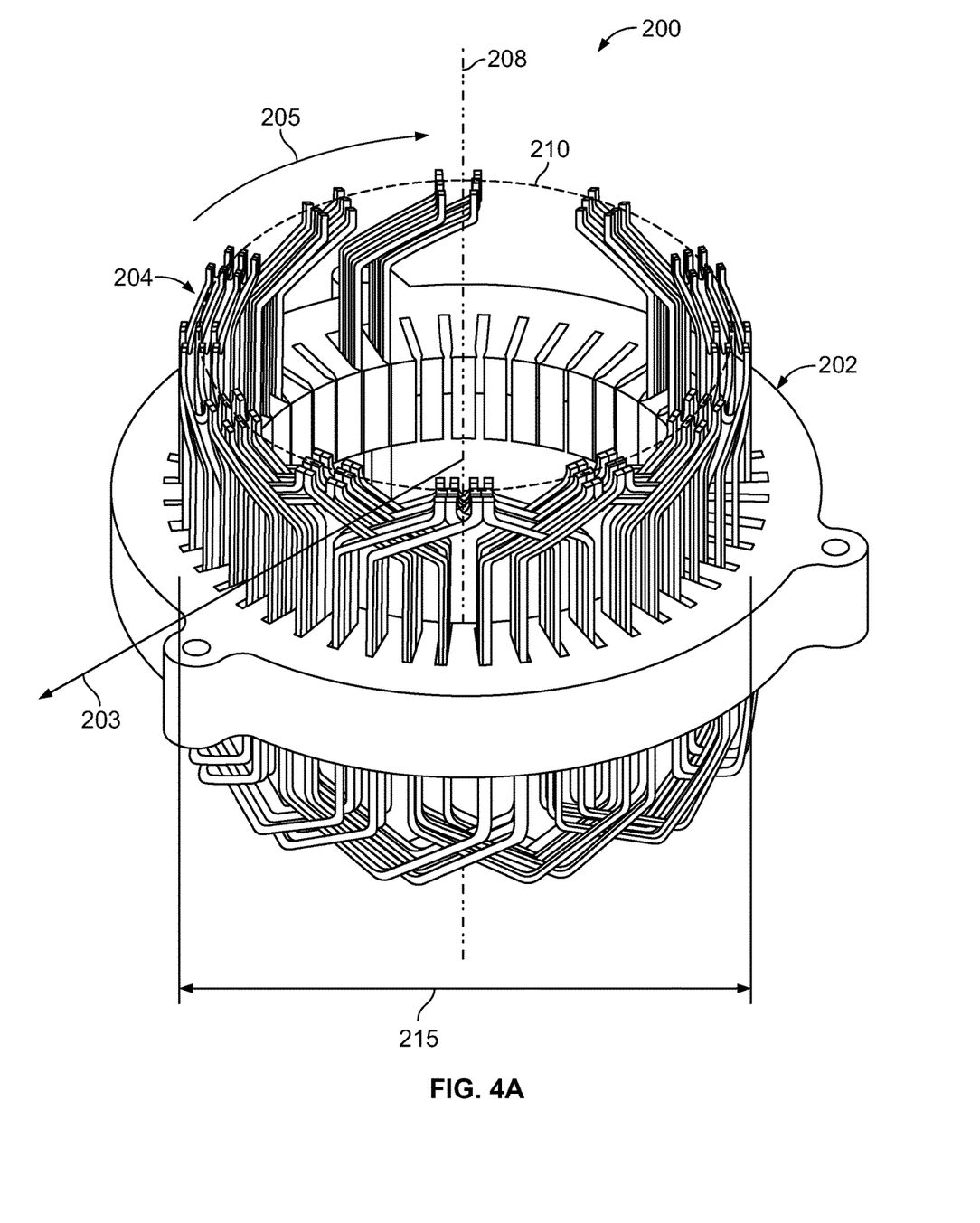
FIG. 4A is a perspective view of an example of a portion of an electric machine winding assembly.
Figure 4B:
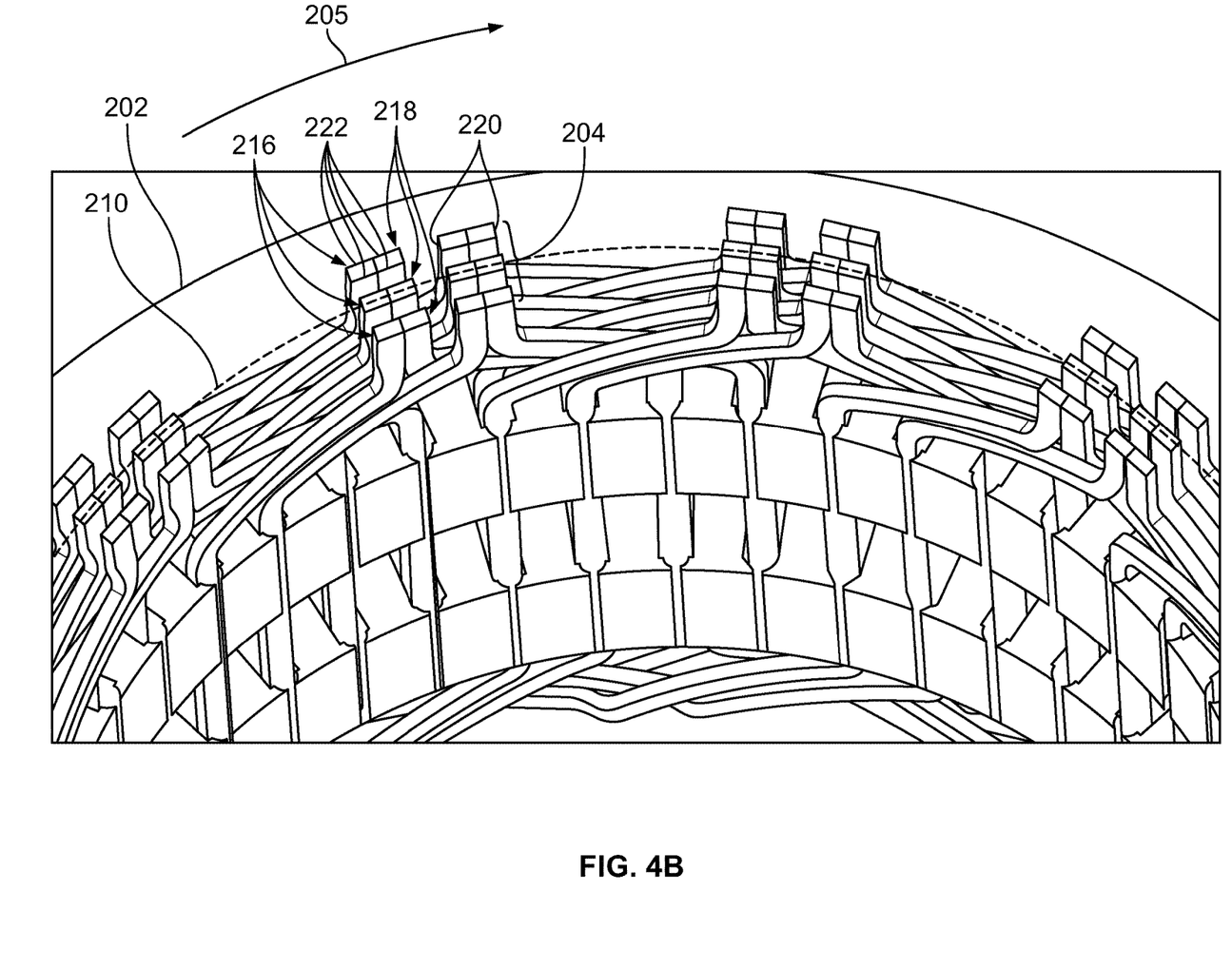
FIG. 4B is a top plan view of the portion of the electric machine winding assembly of FIG. 4A.
Figure 4C:
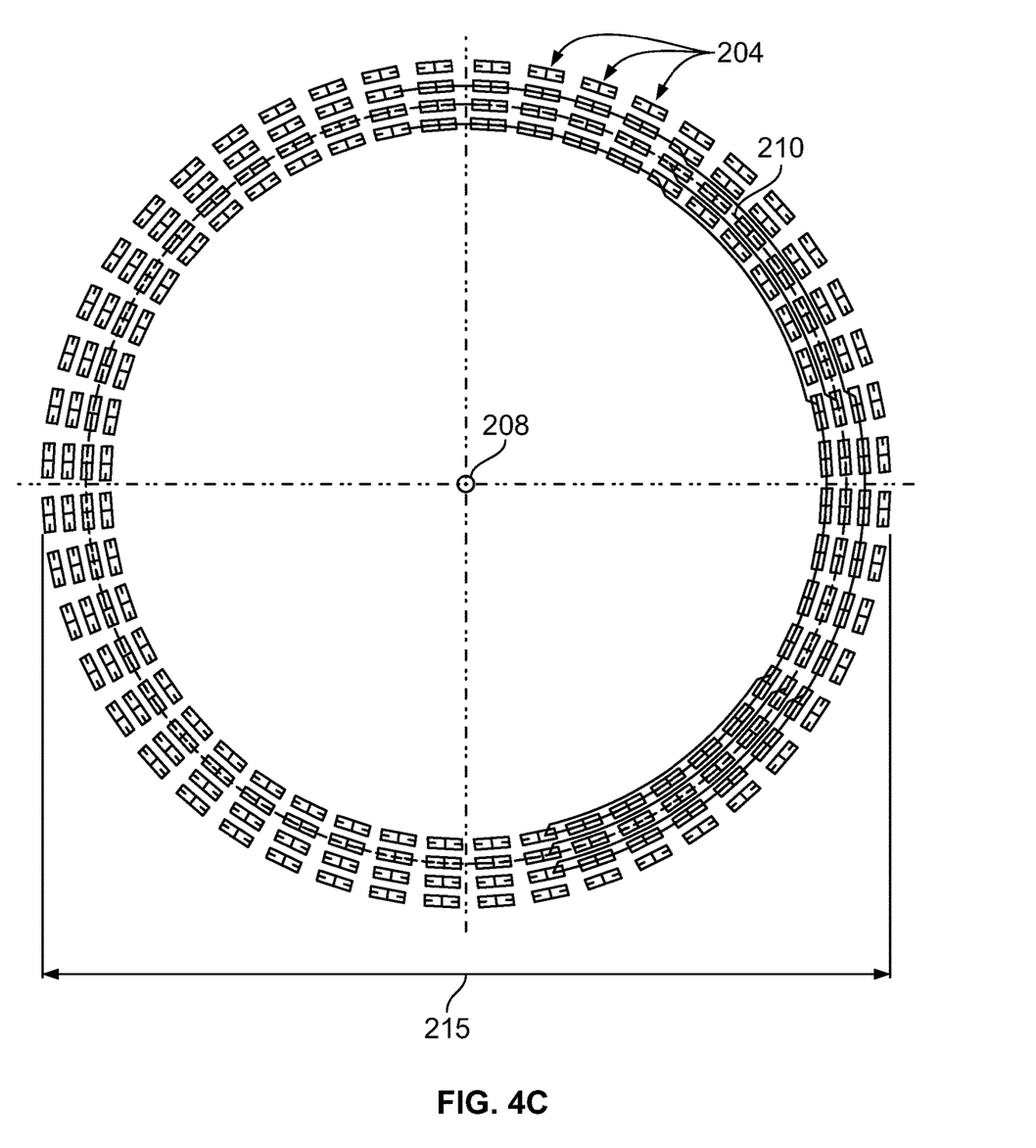
FIG. 4C is a top plan view of a portion of the electric machine winding assembly of FIG. 4A.
Figure 4D:
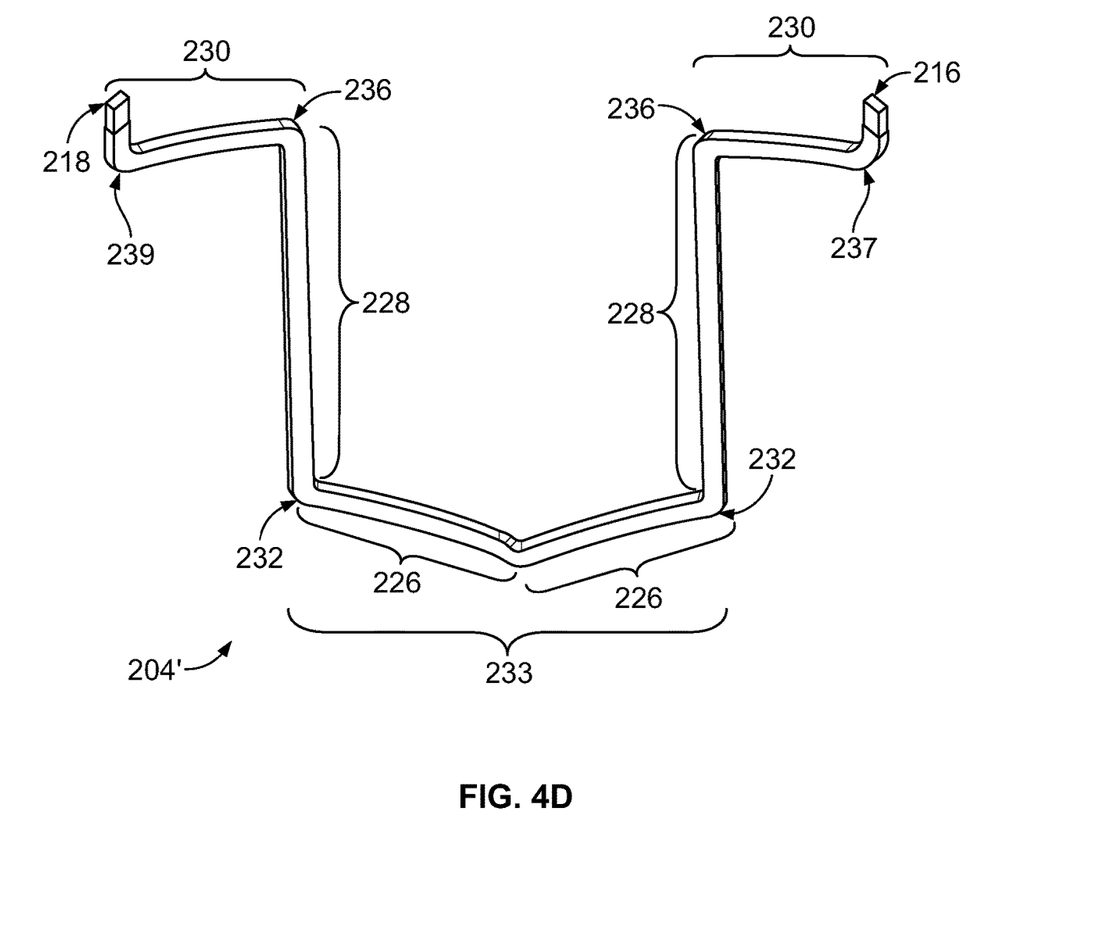
FIG. 4D is a front perspective view of an example of a coil of the electric machine assembly of FIG. 4A.
Figure 4E:
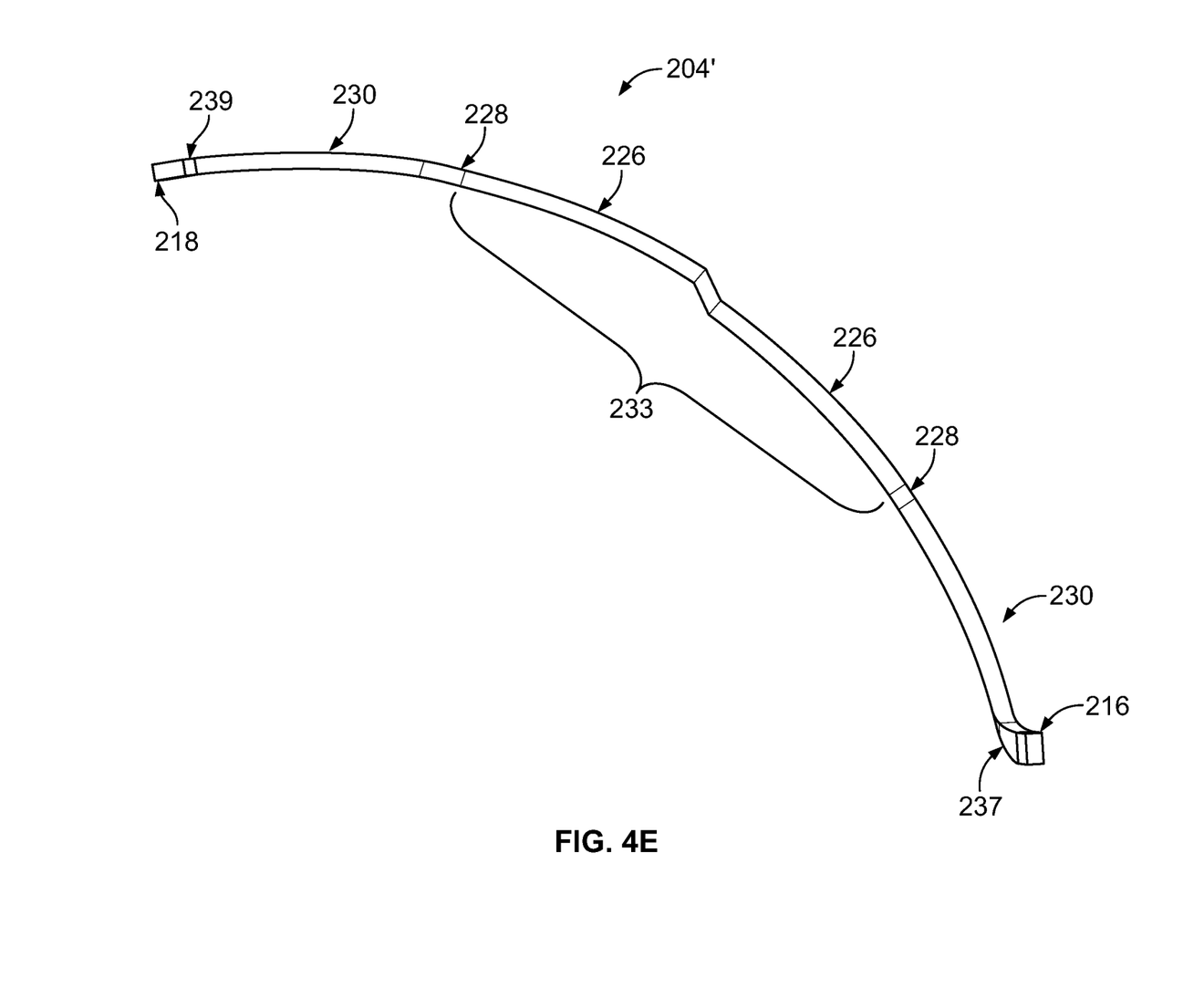
FIG. 4E is a top plan view of the example of the coil of FIG. 4D.

FIGS. 4D and 4E illustrate additional detail of a coil of the pair of windings 204, referred to generally as a coil 204'. Each coil 204' includes a first portion connected to a second portion and arranged with one another to define a U shape. Each of the first portions and each of the second portions may include a lower portion 226, a mid-portion 228, and an upper portion 230. Each of the first portions and each of the second portions includes a first bend 232 to orient respective mid-portions 228 substantially parallel with the central axis 208 of the stator 202. A connection member 233 may comprise both of the lower portions 226 secured to one another. Each of a pair of second bends 236 connects a respective mid-portion 228 to a respective upper portion 230 to assist in circumferentially orienting conductors relative to the central axis 208 as further described herein.

Figures 5A, 5B, 5C:
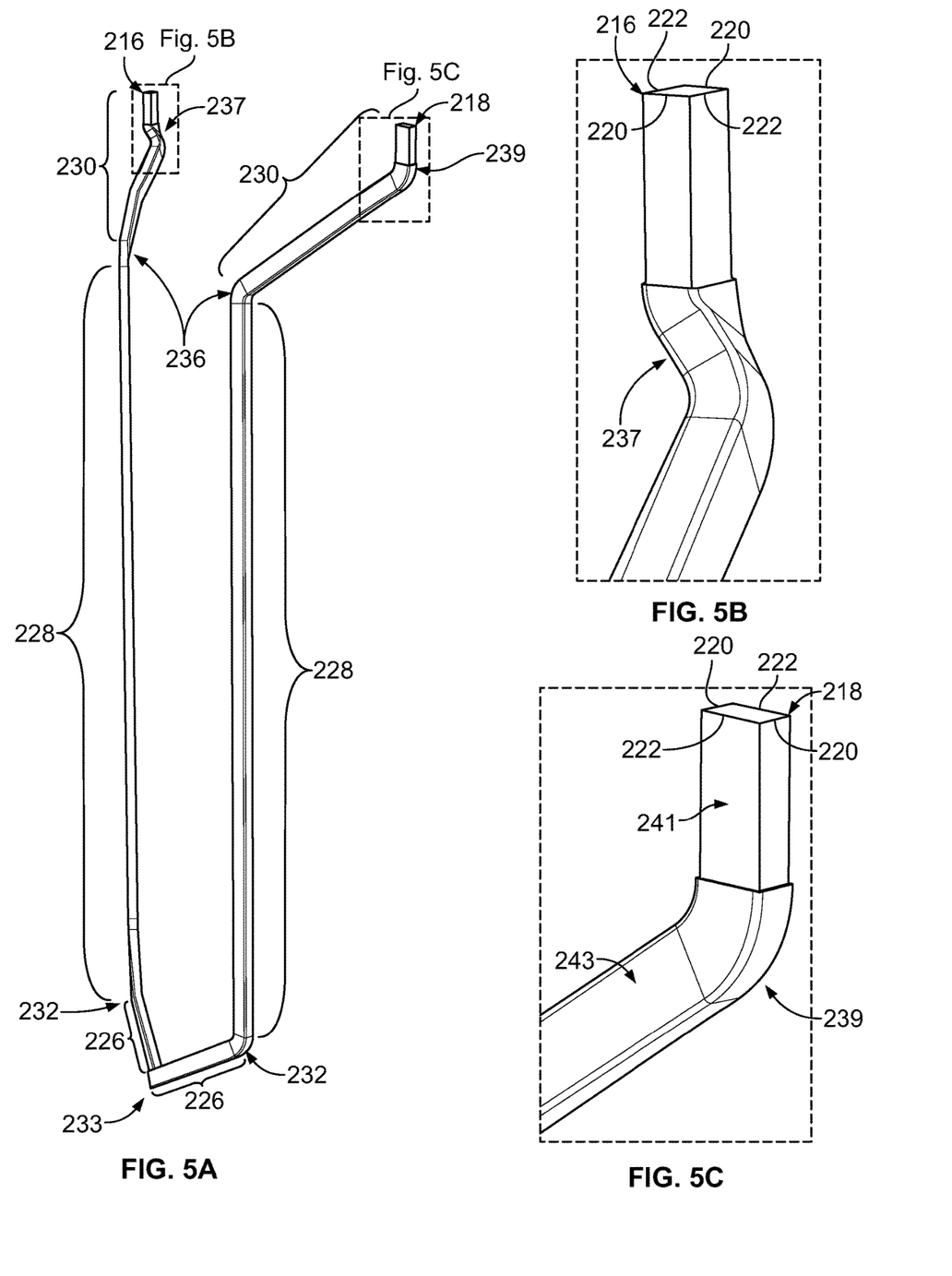
FIG. 5A is a perspective view of an example of a coil of a winding of the electric machine winding assembly of FIG. 4A.
FIG. 5B is a detailed perspective view of an example of a first conductor end of the coil of FIG. 5A.
FIG. 5C is a detailed perspective view of an example of a second conductor end of the coil of FIG. 5A.
Figure 5D:
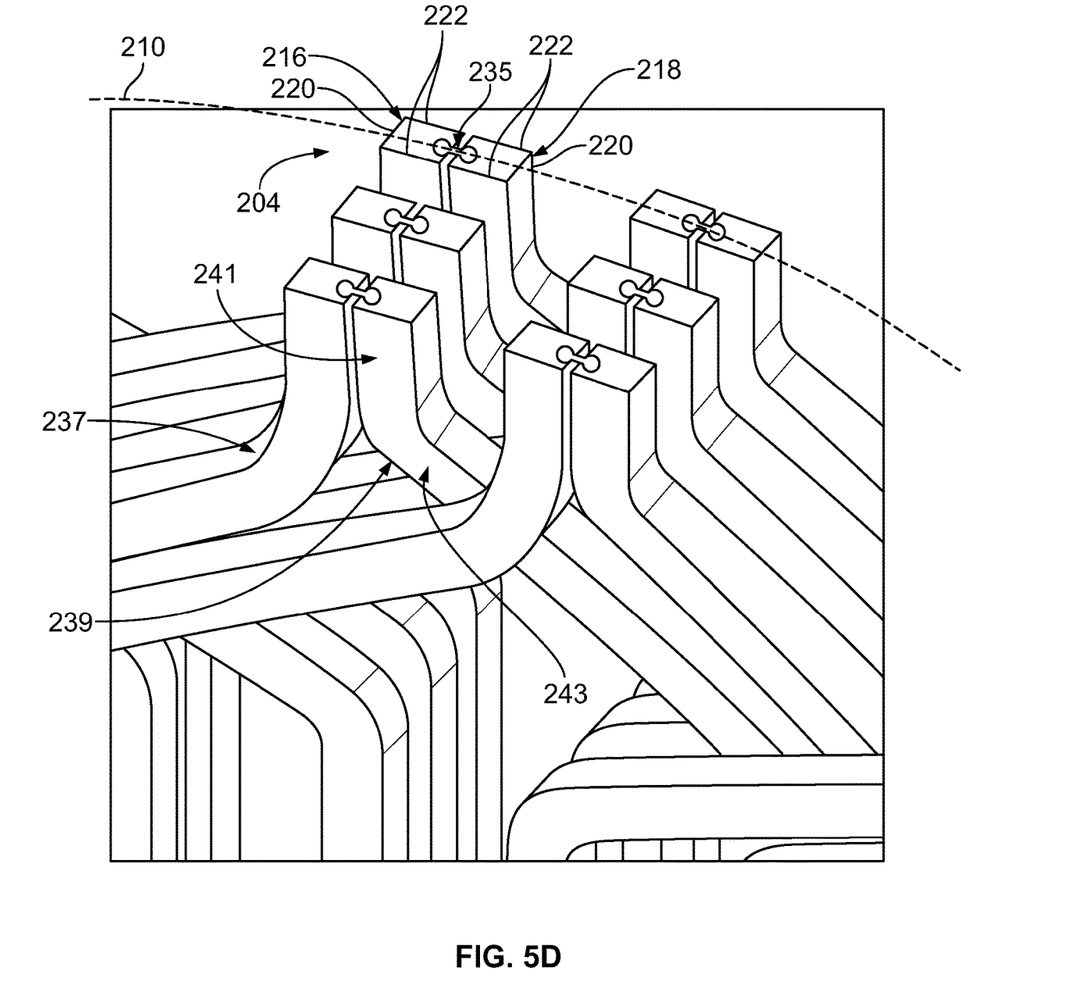
FIG. 5D is a detailed fragmentary perspective view of a portion of the electric machine winding assembly of FIG. 4A illustrating details of an example of a circumferential alignment of conductor ends of coils.

FIGS. 5A through 5D illustrate additional detail of a coil of the pairs of windings 204. Each coil of the plurality of pairs of windings 204 may include a first conductor 216 and a second conductor 218. Each of the first conductors 216 and each of the second conductors 218 includes a pair of opposing minor sides 220 and a pair of opposing major sides 222. Each of the opposing minor sides 220 may also be referred to as radial sides. Each of the opposing major sides 222 may be referred to as circumferential sides. Each of the pair of opposing minor sides 220 may define a length substantially equal to one another. Each of the pair of opposing major sides 222 may define a length substantially equal to one another. In this example, the major sides 222 of each of the conductors of each pair of windings 204 are aligned with one another along one of the circumferential axes 210 to facilitate welding as represented by welds 223 (as illustrated in FIG. 5D). It is contemplated that various dimensions are available for each of the pairs of opposing major sides 222 and the pairs of opposing minor sides 220. Regardless of a dimension of a respective side, a critical feature of the pairs of windings 204 is an orientation of one of the sides along the circumferential axis 210 as further described herein. In one example, upper surfaces of each of the first conductors 216 and the second conductors 218 may define square shapes of substantially equal areas such that the opposing major sides and the opposing minor sides are substantially of equal length.

In this example, the circumferential alignment provides an assembly advantage in comparison to previous electric machine designs in that a gap between pairs of conductors is provided and sufficient to receive an insulation layer therein as further described below. This gap reduces a complexity of inserting the insulation layer therein in comparison to an orientation of the gaps between pairs of conductors as described in relation to the electric machine assembly 150.

Additionally, the circumferential alignment provides a reduced winding diameter in comparison to the electric machine assembly 150 which provides for an electric machine assembly using less packaging space. The circumferential alignment further provides a gap between aligned pairs of conductors sufficient to facilitate insertion of a portion of a clamp device to retain respective pairs of conductors in alignment for welding as further described below. Previous designs, such as the electric machine assembly 150, did not provide this type of sufficient gap and instead each of the pairs of conductors needed to be retained separately to facilitate welding, resulting in an increased assembly time in comparison to the electric machine winding assembly 200.

FIGS. 5A through 5C illustrate further structural detail of an example of a coil of each of the pairs of windings 204. For example, one of the upper portions 230 includes the first conductor 216 and the other of the upper portions 230 includes the second conductor 218 as mentioned above. The first conductor 216 may be supported by a first bend 237 and the second conductor 218 may be supported by a second bend 239. The first bend 237 and the second bend 239 are arranged with one another to align the major sides 222 of the conductors along one of the circumferential axes 210.

The first bend 237 defines a twist shape to orient the major sides 222 of the first conductor 216 along one of the circumferential axes 210. The second bend 239 defines an upward bend shape to orient the major sides 222 of the second conductor 218 along one of the circumferential axes 210. For example, the upward bend shape orients a first plane defined by a first side face 241 of one of the conductors substantially parallel to a second plane defined by a second side face 243 of the upper portion 230. As such, the first bend 237 and the second bend 239 are arranged with one another to align the major sides 222 of both conductors for welding to one another as shown by welds 235.

Figure 6A:
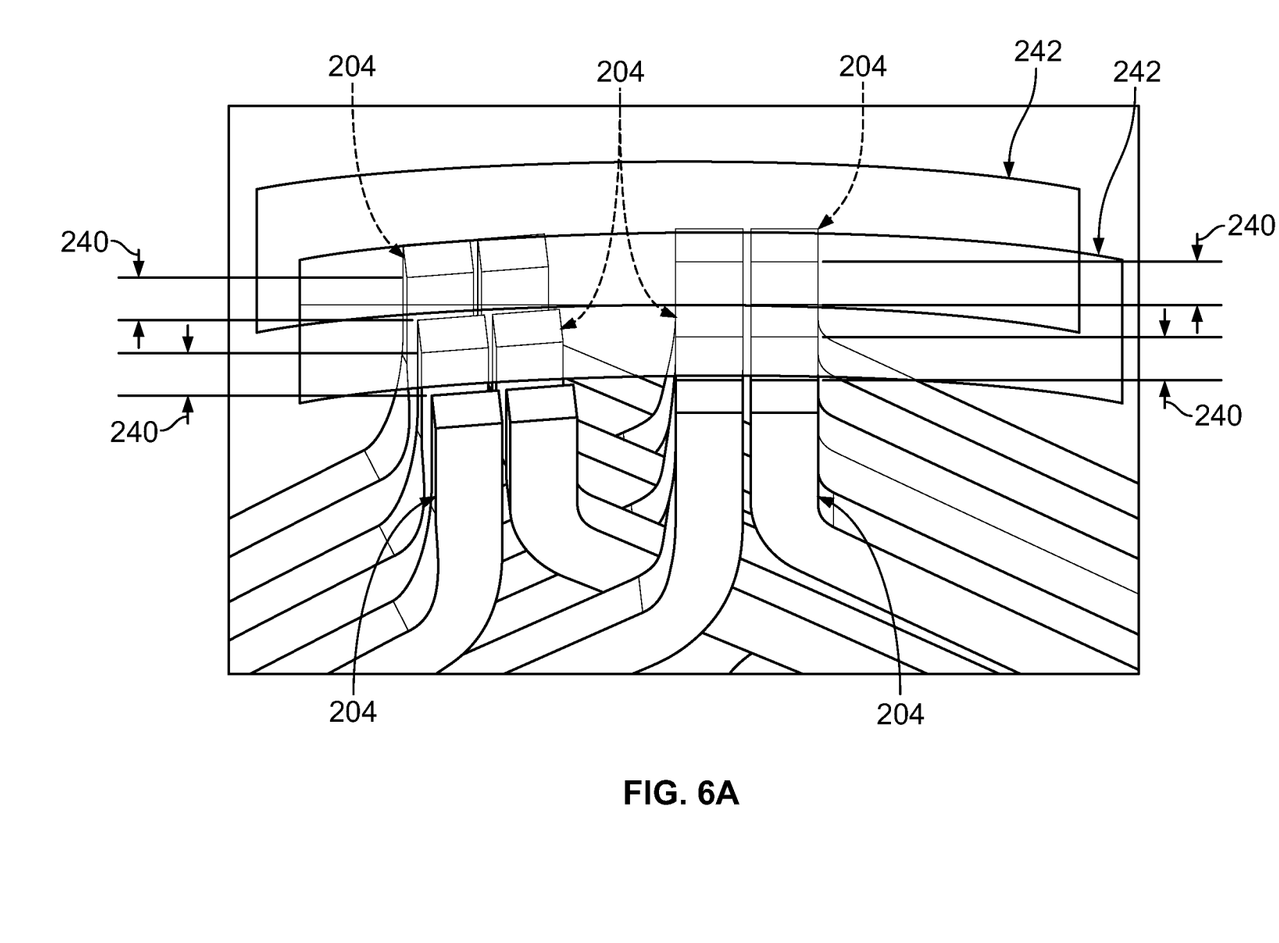
FIG. 6A is a fragmentary perspective view of a grouping of pairs of windings of the electric machine winding assembly of FIG. 4A illustrating insulation layers disposed therebetween.
Figure 6B:
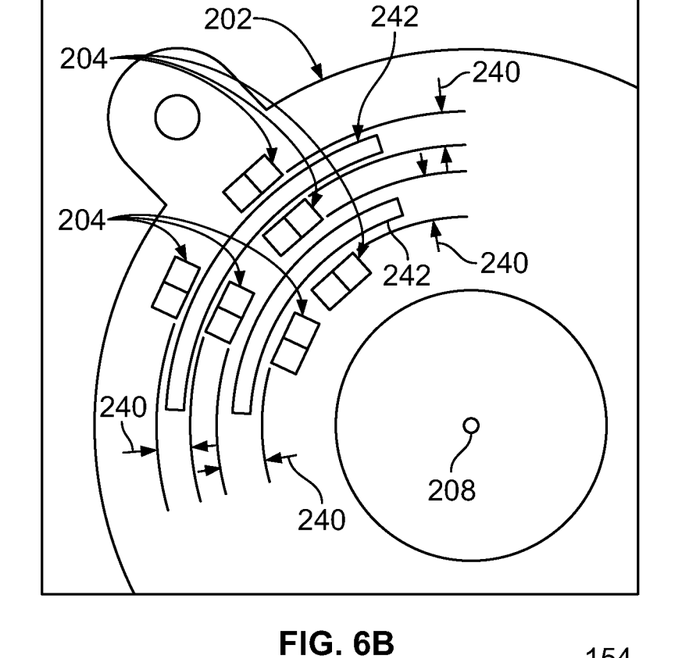
FIG. 6B is a fragmentary top plan view of a grouping of pairs of windings of the electric machine assembly of FIG. 4A.

FIGS. 6A and 6B illustrate a grouping of the pairs of windings 204 of the electric machine winding assembly 200 showing insulation layers disposed therebetween. Each of the pairs of windings 204 may be arranged with the stator 202 to define one or more insulation gaps 240 therebetween. The one or more insulation gaps 240 may be arranged with one another about the central axis 208 to provide space for one or more insulation layers 242 to be disposed therein. Each of the one or more insulation layers 242 may operate to prevent a flow of electricity between conductors included on different circumferential axes 210.

Figure 6C:
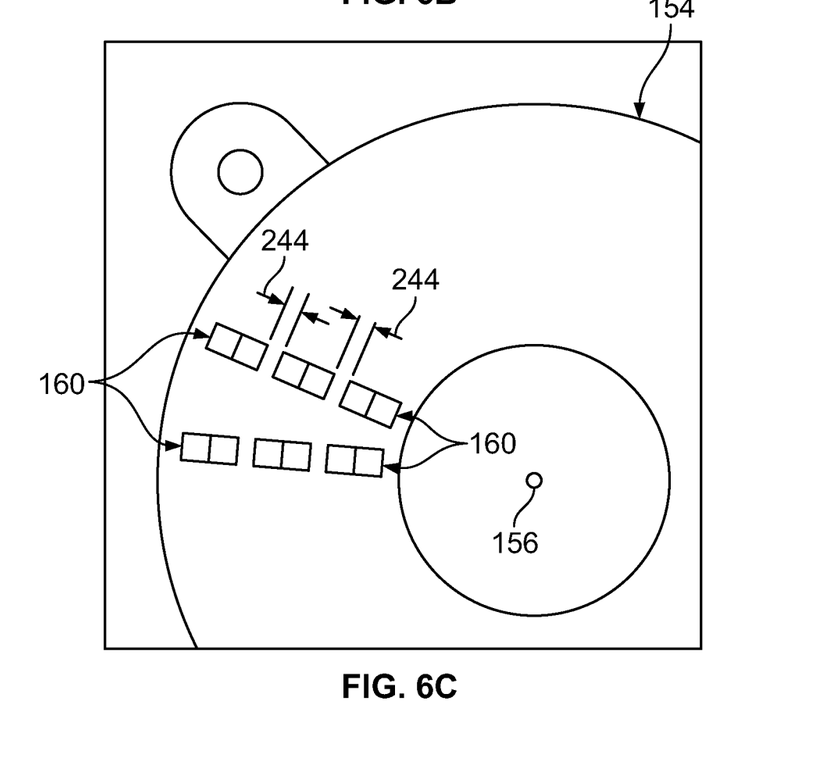
FIG. 6C is a fragmentary top plan view of a grouping of pairs of windings of the electric machine winding assembly of FIG. 3A.

FIG. 6C illustrates a grouping of the pairs of windings 160 of the electric machine assembly 150. Each of the pairs of windings 160 is arranged with the stator 154 to define one or more gaps 244 therebetween. The length of the one or more gaps 244 is less than the length of the one or more insulation gaps 240 making insertion of an insulation layer therein more complex and difficult.

Figure 7:
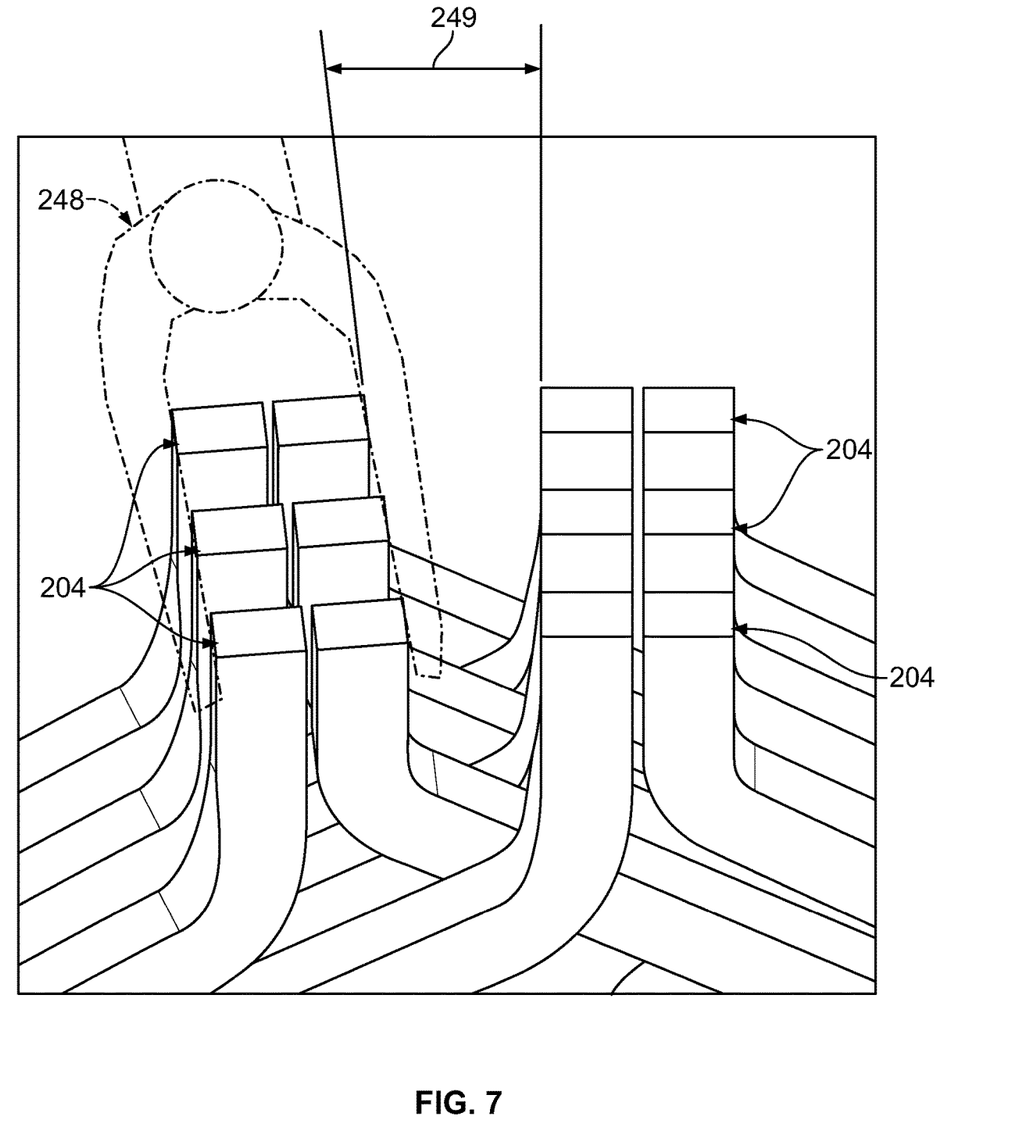
FIG. 7 is a fragmentary perspective view of a portion of the electric machine winding assembly of FIG. 4A showing a portion of a clamp tool.

FIG. 7 illustrates a grouping of portions of the pairs of windings 204 of the electric machine winding assembly 200 showing a clamp tool 248 positioned for retaining conductors of each of the pairs of windings 204 against one another to assist in facilitating welding. For example, the pairs of windings 204 may be arranged with the stator 202 to define clamp gaps 249 between adjacent pairs of windings 204. Each of the sets of pairs of windings 204 may be circumferentially spaced from adjacent pairs of windings 204. Each of the clamp gaps 249 is sized such that the clamp tool 248 may grasp three sets of conductors of the pairs of windings 204 and compress the conductors toward one another. In comparison, the alignment of the conductors of the pairs of windings 160 of the electric machine assembly 150 does not provide gaps of sufficient size to appropriately receive a clamp tool for grasping more than one pair of windings 160 to compress respective conductors toward one another for welding.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine winding assembly comprising:
   a stator defining a central axis; and
   windings extending from within the stator, each coil including a pair of conductor ends, each conductor end including a minor side and a major side,
   wherein the windings are arranged with the stator such that each of the major sides are aligned along a circumferential conductor axis relative to the central axis to facilitate welding adjacent conductor ends to one another.

2. The assembly of claim 1, wherein each coil of the windings further includes two portions defining a U shape, wherein each of the two portions includes a lower portion, a mid-portion, and an upper portion, and wherein one of the mid-portions includes a first bend defining a twist shape to orient the major sides of one of the pair of conductor ends along the circumferential conductor axis.

3. The assembly of claim 2, wherein the other of the mid-portions defines an upward bend shape to orient the major sides of the other of the pair of conductor ends along the circumferential conductor axis.

4. The assembly of claim 1, wherein the windings further include a second pair of conductor ends, each including a minor and a major side, and wherein the major sides of each of the second pair of conductor ends are radially spaced from the major sides of the pair of conductor ends to define an insulation gap therebetween and sized to receive an insulation layer.

5. The assembly of claim 1, wherein the windings further include at least two pairs of windings circumferentially spaced from one another to define a clamp gap therebetween and sized to receive a portion of a clamp tool to compress pairs of conductor ends of each of the at least two pairs of windings toward one another.

6. The assembly of claim 1, wherein the stator further defines one or more circumferential stator axes about the central axis, and wherein the circumferential conductor axis is substantially parallel to one of the one or more circumferential stator axes.

7. A vehicle electric machine winding assembly comprising:
a stator defining a central axis and one or more circumferential axes about the central axis; and
at least two pairs of coils extending from the stator, each including first and second conductor ends and one of the two pairs of coils including an upper portion including a first bend to orient one of the first and second conductor ends along one of the one or more circumferential axes for welding to one another.

8. The assembly of claim 7, wherein major sides of each of the at least two pairs of coils are radially spaced from one another to define an insulation gap therebetween and sized to receive an insulation layer.

9. The assembly of claim 7, wherein each of the coils further includes a lower portion and a mid-portion, and wherein the other upper portion includes a second bend shaped to orient a plane defined by a first face of a respective conductor end substantially parallel with a second face of a respective upper portion.

10. The assembly of claim 7, wherein each of the coils further includes a lower portion and a mid-portion, wherein each of the windings includes a second bend orienting a respective mid-portion substantially parallel to the central axis.

11. The assembly of claim 7, wherein each of the first and second conductor ends includes a minor side shorter than a major side, and wherein each of the major sides are aligned with one another along one of the one or more circumferential axes.

12. The assembly of claim 7, wherein the windings further include at least three pairs of coils each including first and second conductor ends, and wherein each of the at least three pairs of coils are circumferentially spaced from one another to define a clamp gap between each of the at least three pairs of coils sized to receive a portion of a clamp tool to compress respective first and second connector ends toward one another.

13. The assembly of claim 7, wherein the first bend defines a twist shape.

14. The assembly of claim 7, wherein the other of the two pairs of coils includes a second upper portion including a third bend to orient a first plane defined by a first side face of the other of first and second conductor ends substantially parallel with a second plane defined by a second side face of one of the second upper portion.

15. An electric machine winding assembly comprising:
a stator defining a central axis and one or more circumferential axes about the central axis; and
a plurality of pairs of windings each extending from the stator, each coil of the plurality of pairs of windings including first and second members, each of the first and second members including a lower portion, a mid-portion, and an upper portion having a conductor end secured thereto,
wherein one of the upper portions includes a first bend defining a twist shape to orient a respective conductor end along one of the one or more circumferential axes.

16. The assembly of claim 15, wherein the plurality of pairs of windings includes at least two pairs of coils radially spaced from one another to define an insulation gap therebetween and sized to receive an insulation layer.

17. The assembly of claim 15, wherein the plurality of pairs of windings further include at least two pairs of coils circumferentially spaced from one another to define a clamp gap therebetween and sized to receive a portion of a clamp tool to compress pairs of conductor ends of each of the at least two pairs of coils toward one another.

18. The assembly of claim 15, wherein each of the conductor ends includes a pair of opposing minor sides and a pair of opposing major sides, and wherein each of the pair of opposing major sides are aligned with one another along an axis that is not oriented radially relative to the central axis.

19. The assembly of claim 15, wherein one of the upper portions of each of the first and second member includes a second bend defining an upward bend to orient a first plane defined by a first side face of one of the conductor ends substantially parallel with a second plane defined by a second side face of one of a respective upper portion.

20. The assembly of claim 15, wherein each of the first and second members includes a third bend between a respective lower portion and a respective mid-portion to orient each of the mid-portions substantially parallel with the central axis of the stator.

* * * * *